May 9, 1967

A. M. LIPPENS 3,317,956

MIXING DEVICE FOR EXTRUDING APPARATUS

Filed Dec. 22, 1964

INVENTOR
ANDRÉ M. LIPPENS
BY Raphael Semmes
ATTORNEY

May 9, 1967          A. M. LIPPENS          3,317,956

MIXING DEVICE FOR EXTRUDING APPARATUS

Filed Dec. 22, 1964          3 Sheets-Sheet 2

INVENTOR
ANDRÉ M. LIPPENS
BY Raphael Semmes
ATTORNEY

May 9, 1967 A. M. LIPPENS 3,317,956
MIXING DEVICE FOR EXTRUDING APPARATUS
Filed Dec. 22, 1964 3 Sheets-Sheet 3

INVENTOR
ANDRÉ M. LIPPENS
BY Raphael Semmes
ATTORNEY

United States Patent Office 3,317,956
Patented May 9, 1967

3,317,956
MIXING DEVICE FOR EXTRUDING
APPARATUS
André M. Lippens, Baltimore, Md., assignor to Hedwin Corporation, New York, N.Y., a corporation of Maryland
Filed Dec. 22, 1964, Ser. No. 420,387
5 Claims. (Cl. 18—12)

This invention relates to single screw extruders of the type conventionally employed in the production of plastic pipe, tubing, etc., and consists more particularly in new and useful improvements in a mixing device for installation in the flowpath of the plastic material being fed to the extrusion die.

One of the most troublesome shortcomings of conventional single screw extruders has been a lack of mixing action on the material being fed to the die. Most of the thermoplastic materials do not, in the metering zone of the screw, move continuously from the root of the screw toward the surface of the barrel and vice versa. For example, experiments carried out with a mixture of white and black thermoplastic pellets fed in a single screw extruder have shown, when the extruder was stopped and the screw immediately pulled out for examination of the material, that the pellets close to the barrel were very well fluxed together, while those in contact with the root of the screw remained unmixed.

While the mixing action of the screw can always be increased by using shallower flights, this results in a lower output per r.p.m., and, also, in a higher amount of frictional heat build-up which is especially objectionable when the material is heat sensitive. A number of special screw designs have been developed in an effort to overcome this shortcoming, such, for example, as double-stage screws, dolmetch screws, screws with offset cores wherein the axis of the core and the axis of the flight are different so that the flight depth varies periodically with the pitch, etc. However, none of these special screws have solved the above problem, in that either the material mixes correctly and then overheats, or if it does not overheat, there is not adequate mixing.

It is an object of the present invention to provide a mixing device for single screw extruders which will produce a highly efficient mixing action without excessively overheating the thermoplastic material.

Another object of the invention is to provide a mixing device comprising at least two associated mixing rings longitudinally spaced and respectively formed with co-acting peripheral slots disposed sequentially in the flowpath of the thermoplastic material being fed to the die and wherein the rings are relatively rotatable so that a shearing action is initially imposed on the material flowing through the slots of both rings, after which the flowpath is suddenly broken twice, once at the exit of the first ring slots, and then at the entrance of the second ring slots. Then, at the exit of the second ring slots, the flowpath is once more broken, but this time more gradually.

A further object of the invention is to provide a mixing device of the character above referred to, wherein, in spite of the broken flowpath, there is no dead spot where the material might stagnate, and the base of each mixing ring is provided with a sufficient radius to prevent the material from sticking in sharp corners.

Another object of the invention is to provide a double mixing ring construction wherein the rings may be selectively set so that the spacing between the opposing faces of the rings may be varied to provide four different spacing values and four different mixing actions.

A still further object of the invention is to provide a mixing device comprising two concentric, longitudinally spaced mixing rings having coacting peripheral slots so arranged that all of the slots of one ring can never come into direct alignment with all of the slots of the other ring to avoid creating a pulsating output.

With the above and other objects in view which will appear as the description proceeds, the invention consists in the novel features herein set forth, illustrated in the accompanying drawings, and more particularly pointed out in the appended claims.

Referring to the drawings in which numerals of like character designate similar parts throughout the several views.

Figure 1:
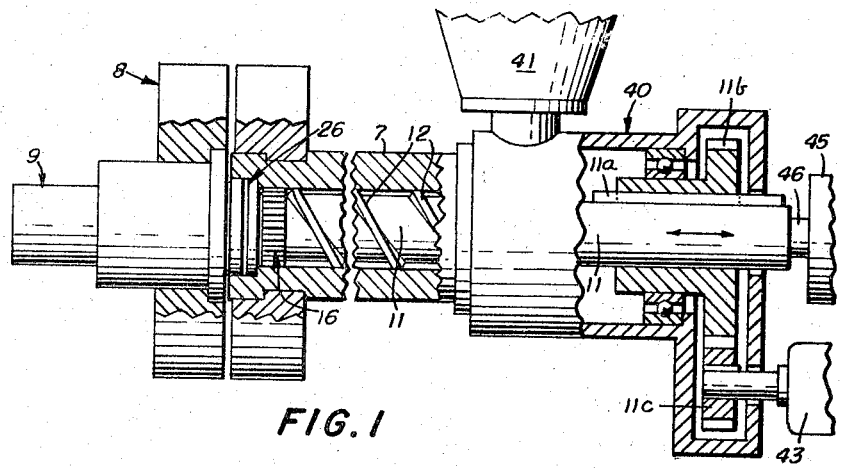
FIG. 1 is a longitudinal, sectional view showing a conventional extruder barrel and longitudinally adjustable screw equipped with the mixing device of the invention.

In the drawings, 7 represents the stationary barrel of a conventional extruder to the end of which is affixed in any suitable manner an extruder head, generally represented by the numeral 8, the discharge end of which is provided with a forwardly projecting outer die member 9 having a discharge opening which is concentric with the barrel 7. Within the barrel 7, a worm screw 11 is rotatably mounted in the usual manner with its working threads 12 in sliding contact with the inner periphery of the barrel 7 so that upon rotation of the screw 11 by suitable drive means to be hereinafter described, the plastic material fed to the apparatus is delivered to the die head.

Figure 2:
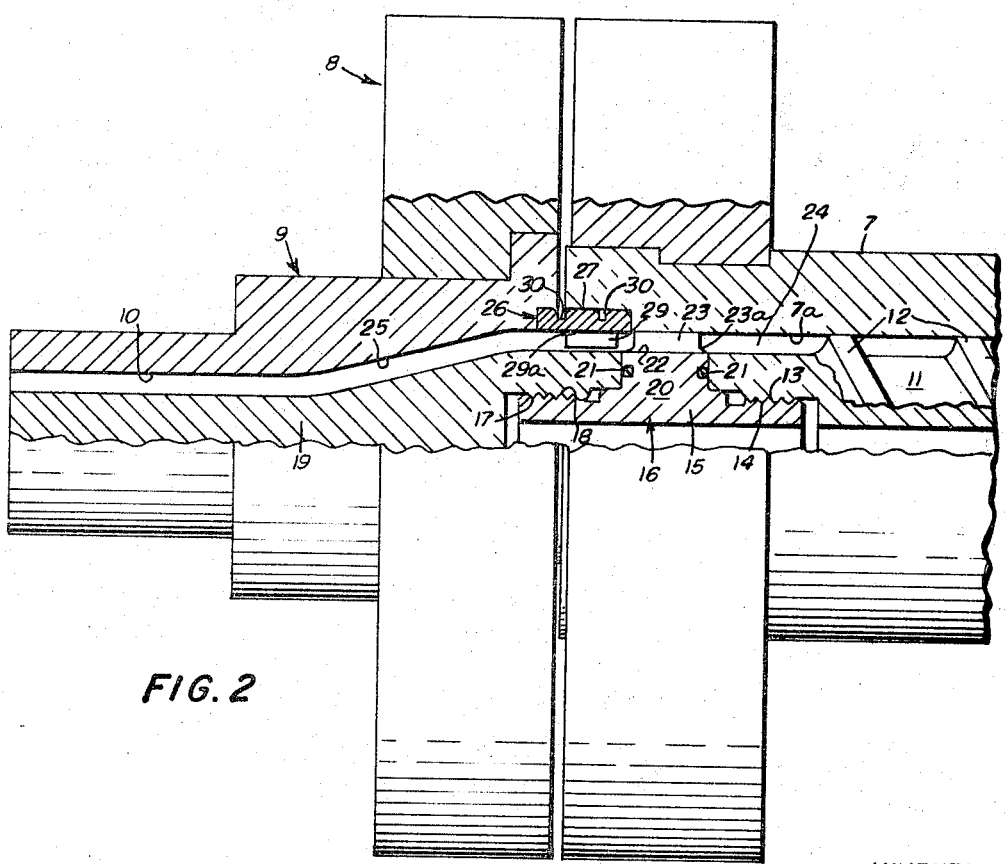
FIG. 2 is an enlarged, longitudinal, sectional view illustrating the assembly of the mixing device.
Figure 3:
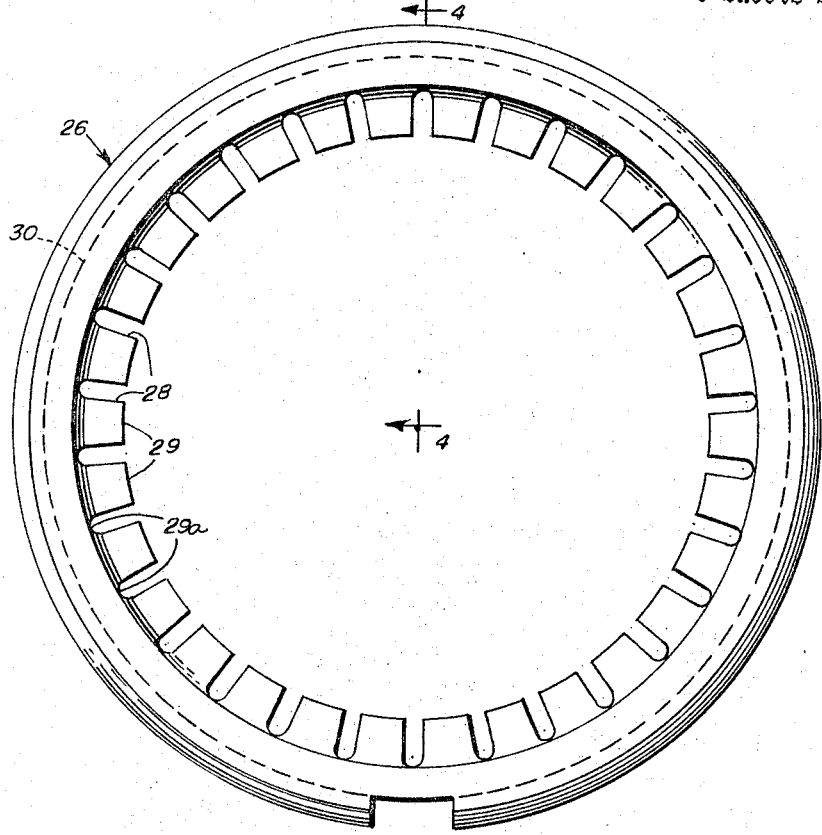
FIG. 3 is a plan view of the outer mixing ring of the invention.
Figure 4:
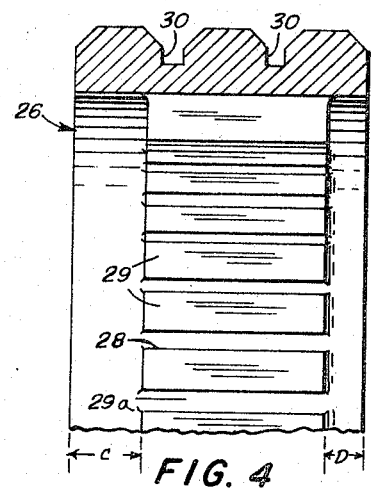
FIG. 4 is a sectional view taken on line 4—4 of FIG. 3.

As best seen in FIG. 2, the inner end of the screw 11, which is preferably hollow, is threaded as at 13 to receive the complementary external threads 14 on one side of the cylindrical base 15 of the inner mixing ring 16. The opposite side of the ring base 15 is externally threaded as at 17 to engage complementary threads 18 on the inner die member or mandrel 19 of the extruding device. The central portion of the ring 16 is extended radially to provide an annular rim 20 which lies between the opposed extremities of the screw 11 and mandrel 19, where it is preferably sealed with conventional O-rings 21.

Figure 5:
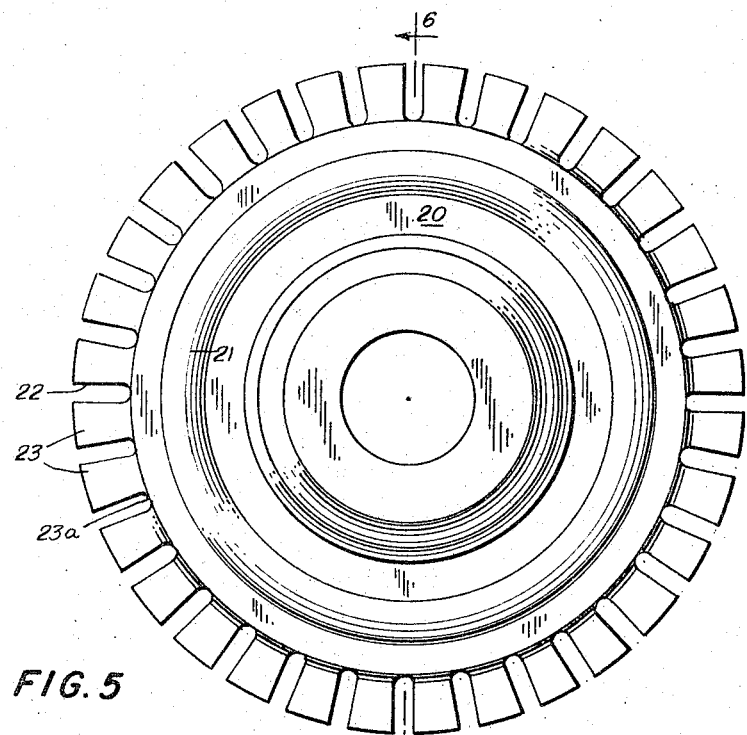
FIG. 5 is a plan view of the inner mixing ring.

The periphery of the rim 20 is provided with a series of transverse, radial slots 22 which extend entirely around the rim so that the intervening portions of the rim form alternating fins 23 which extend radially into sliding engagement with the inner periphery 7a of the bore 7. Thus, the rim 20 forms a series of alternating slots and fins, as see in FIG. 5. Preferably, the base of each of the fins 23 is provided with a sufficient radius 23a to prevent material from sticking in sharp corners of the grooves 22.

Returning to FIG. 2 of the drawings, it will be apparent that the screw 11 and the attached inner ring 16 and mandrel 19 rotate as a unit within the barrel 7 and outer die member 9 so that the working threads 12 of the screw 11 advance the plastic material through the annular feed passageway 24 between the screw and barrel from which, after passing through the slots of the feed ring, it enters the extrusion passageway 25 of the extrusion head. Coacting with the inner mixing ring 16 is an outer mixing ring 26 which is fixedly connected within a complementary recess 27 in the end of the stationary barrel 7 and arranged coaxially with and in longitudinally spaced relation to the inner mixing ring 16. The inner periphery of the outer ring 26 is transversely slotted in a manner similar to the outer periphery of the inner ring 16. Thus, there are a series of radial slots 28 and intervening, radial fins 29 directed axially of the bore of barrel 7 and arranged in longitudinally spaced relation with respect to the corresponding slots and fins of the inner ring. Also, as in the case of the inner ring, the bases of each of the slots 28 and fins 29 are provided with a radius 29a to prevent material from sticking.

Figure 6:
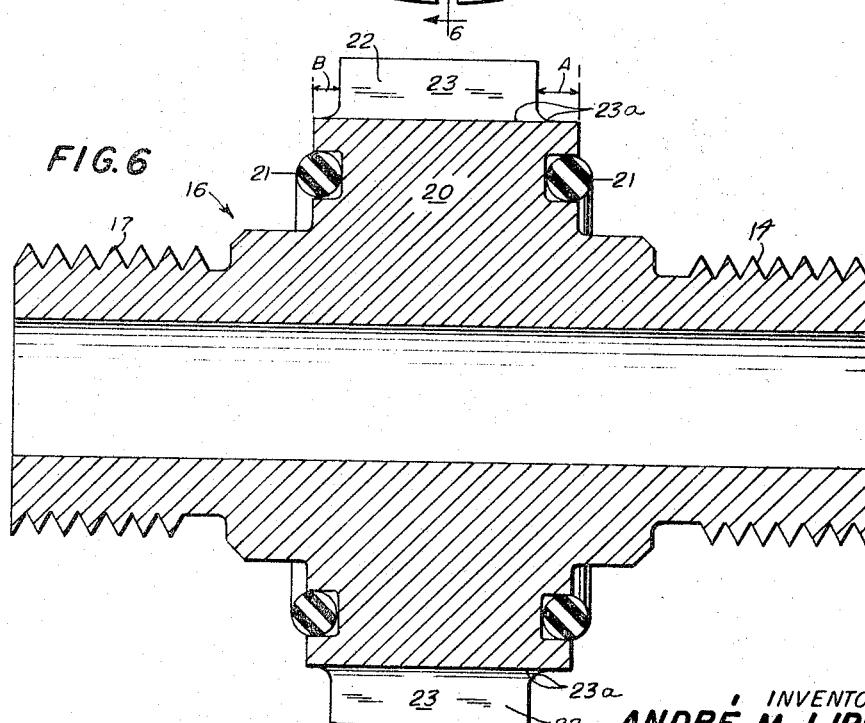
FIG. 6 is a sectional view taken on line 6—6 of FIG. 5.

As previously stated, one of the objects of this invention is to provide a double mixing ring assembly which is designed to permit the relative spacing of the mixing elements or the respective slots and fins on the peripheries of the rims to selectively obtain four different mixing actions. This is accomplished by arranging the slotted portions of the respective rings in longitudinally, offset relation to the longitudinal centers of the rings. Thus, as will be seen from FIG. 6, the distance indicated by the arrows A between one end of the slotted portion of the rim 20 and the corresponding edge of the rim is greater than the distance indicated by the arrows B between the opposite end of the slotted portion and the corresponding edge of the rim. The same is true with respect to the outer ring 26 where the distance between the arrows C is greater than the distance between the arrows D.

It will thus be seen that by reversing the relative positions of one or both of the rings 16, 26, the spacing of the mixing portions of the rings can be selectively adjusted between four different spacing values and one pair of rings can provide four different mixing actions, according to the manner in which they set. In one embodiment of this invention, it has been found that these four values were respectively 160, 200, 240 and 280 mils. Obviously, by variations in the offsetting of the mixing portions of the rings, these spacing values can be correspondingly varied.

Referring to FIG. 2, it will be seen that the operation of setting the spacing of the mixing rings may be easily accomplished. The outer ring 26 extends longitudinally beyond the end of the barrel 7 and partially within the outer die member 9, and its outer periphery is provided with two annular grooves or recesses 30, one of which lies partially beyond the end of the barrel 7, regardless of the setting of the ring. Thus, by removing the outer die member 9 so as to expose the adjacent portion of the ring 26, a suitable tool can be inserted in the exposed groove 30 to pull the ring out of the recess 27 in the bore 7. When the ring is reversed in the bore 7, the opposite recess 30 is employed for this same purpose. The reversal of the inner ring 16 is accomplished by removing the inner die member 19 from the threads 17 and unscrewing the ring from the threads 13 in the screw 11, after which the parts are re-assembled in the opposite setting.

This arrangement of two coacting rings provides a single screw extruder with an efficient mixing action which eliminates excessive overheating of the thermoplastic material. One ring 16 being attached to the end of the screw 11 rotates with the screw, while the other ring 26 is fixed by means of a suitable key or the like to the end of the barrel 7 and is thus stationary. The mixing action of the rings as the plastic material progresses through the passageway 24 is originated by the shear imposed on the material flowing through the slots of both rings and in between the rings where the flowpath is suddenly broken twice, once at the exit of the first ring slots and then at the entrance of the second ring slots. At the exit of the second ring slots, the flowpath is once more broken, but this time not as sharply. As previously stated, in spite of the broken flowpath, there is no dead spot where the material might stagnate and the radii of the ring slots is such as to prevent the material from sticking in sharp corners.

The width of the slots in each ring depends upon the material to be processed and the intensity of the mixing action desired. The number of slots should be preferably different in each of the associated rings, so that all of the slots of one ring can never come in front of all of those of the other ring which would create a pulsating output.

If the drive of the screw is provided with a conventional mechanism which allows a longitudinal movement of the screw, as shown in FIG. 1, the distance between the two rings can be adjusted during the extrusion, and thus the mixing efficiency can be continuously and steplessly regulated.

Referring to FIG. 1, it will be seen that the rear end of the screw 11 is splined or keyed as at 11a to a gear 11b driven by a gear 11c, operatively connected to a suitable motor 43. Also connected to and extending rearwardly from the screw 11 is a connecting rod 46 which is operatively associated with any conventional hydraulic unit 45 for longitudinal movement in either direction. Thus, while the screw 11 is being driven by motor 43 and gear train 11b, 11c, the screw can be adjusted longitudinally in the barrel 7 by actuating the hydraulic unit 45 due to the splined or keyed connection 11a.

With an adjustable drive mechanism of this or any other conventional type, it will be seen that in addition to the spacing adjustments of the mixing rings per se as previously described, a further spacing adjustment is possible through the longitudinal adjustment of the screw which carries with it the inner mixing ring 16. Collectively, these various adjusting means provide a highly versatile mixing mechanism.

The shape and dimensions of the slots in the mixing rings, the number of slots, as well as the distance between the two rings, can be varied widely according to the mixing action desired. While with heat sensitive materials such as unplasticized PVC, the mixing rings will be shaped and positioned in such a way as to achieve maximum dispersion without overheating the material; in other cases, such as with polyolefins of very high molecular weight, it might be desirable to develop very high shear rates, and, consequently, more frictional heat in order to lower the molecular weight of the resin and thus increase its processability as expressed by the resulting increase in melt index (this operation is called visbreaking) and the mixing rings can be shaped and set accordingly.

It has been found that with these mixing rings of the present invention, a breaker plate and screen packs are seldom necessary. This is an important advantage of the invention because of the fact that screen packs have the tendency to clog and must be replaced from time to time, causing undesirable interruptions of production.

A further advantage of the invention lies in the fact that the mixing action of the rings is so complete that it is possible to extrude circular profiles, such as pipes, tubing, and blown extruded films through dies with a rotating mandrel connected directly to the end of the extrusion screw, as shown in FIG. 2. The design and construction of the dies becomes extremely simple and inexpensive. No torpedo holder, no spider with streamlined webs, and no delicate adjustments are necessary with the use of this invention.

In the specific case of blown extruded film, the rotation of the mandrel of the die provides a random distribution of wall thickness irregularities around the periphery which prevents the formation of "cords" during the winding operation. With conventional dies, a complicated mechanism for rotating the bushing or outer die member is necessary to obtain the same effect.

In order to illustrate the effectiveness of the mixing device of the present invention, a number of tests were made with a more or less conventional extruding apparatus, both with and without the mixing rings, and the following examples are submitted.

*Example I*

A 2½" single screw extruder with a barrel length equal to 20 diameters ($L/D=20$) was operated with a single stage screw and a pipe die, and was fed with an opaque, unplasticized polyvinylchloride (PVC) dry blend. The screw had the following characteristics: Pitch constant all over the screw and equal to the outer diameter of the screw (one D); the flight depth at the feeding zone was .430″ and at the metering zone .215″; the root of the screw was constant over a length of 3D in the feeding zone and also in the metering zone, and between the two it increased gradually. The die bushing and mandrel were designed for a 1″ nominal size pipe with a wall thickness of .062″. The PVC dry blend contained 5% of lead base stabilizers, part of which acted as a lubricant. Additional lubrication was given by .25% of stearic acid. The PVC compound contained also 3% of $TiO_2$ and a very small quantity of carbon black acting as opacifying agents.

The various zones along the barrel, as well as the die, were heated with electric heaters, each of which was controlled by a thermocouple associated with an electronic temperature regulator. The zones of the barrel were also provided with an air blower which was switched on by the temperature regulator whenever the temperature indicated by the thermocouple overrode the desired set temperature. The screw was cored through its entire length and its temperature was kept constant, in this case at 200° F., by means of a flow of oil entering the screw through a rotary joint. The screw drive mechanism allowed the screw speed to vary between 15 and 40 r.p.m.

In the absence of mixing rings at the ends of the screw and barrel, when the extruder was fed with 100% virgin PVC dry blend, the extruded pipe had a very poor appearance through the entire speed range of the screw, the temperatures along the barrel and the die being set between 350 and 400° F. At the lowest screw speed and the highest temperature, the outer surface of the extruded pipe had the best appearance, but the inner surface was still rough, which indicated that the material had been poorly mixed and (or) overheated. As the screw speed increased, both surfaces deteriorated.

When the mixing rings of the present invention were added with the gap between the mixing rings set at .160″, both surfaces of the extruded pipe were smooth and glossy for the whole speed range, the stock temperature of the material varying between 395° F. and 420° F. from the lower speed to the highest.

When scrap (extruded material coarsely ground for re-use) was added to the virgin PVC compound in proportions varying from 5 to 50% for 95 to 50% virgin, in the absence of mixing rings, the extrudate showed lumps of material incompletely mixed with the surrounding material. These lumps resulted in uneven inner and outer surfaces of the pipe which also had poor mechanical properties. This was demonstrated by submitting the pipe to an impact test in which a falling weight was dropped on the pipe, which then broke and shattered as would any very brittle material.

When the mixing rings of the invention were used in the extruder, the extrudate obtained with the blends of scrap and virgin material remained smooth and glossy, and the pipe submitted to the impact test showed either no failure or a ductile failure instead of a brittle failure.

*Example II*

With the use of the same extruder, screw and die described in Example I, a clear, unplasticized PVC dry blend containing tin based stabilizers was fed to the apparatus employing the same operating conditions. Temperatures between 350 and 400° F. were maintained and the screw speed was between 15 and 40 r.p.m.

Without the use of the mixing rings of the invention, it was impossible to obtain a smooth, clear tube. As the screw speed was increased, small air bubbles appeared in the extrudate, which grew bigger and more numerous. The use of the mixing rings made it possible to obtain a smooth and bubble-free extrudate over the entire screw speed range. The addition of scrap to the virgin PVC powder compound again resulted in a lumpy extrudate in the absence of mixing rings, while with the addition of the mixing rings, the extrudate again became smooth and glossy.

*Example III*

Again, using the same extruder and screw previously described, but provided with a 90° angle parison die was fed with a clear, unplasticized PVC dry blend. The die extruded a tube vertically downward into a rotary blow-molding machine. Each time the tube was caught in between the two halves of a mold, the tube was cut close to the die, the mold withdrawn, and a new length of tube was extruded in between another mold.

Without the use of the mixing rings, the blow-molded bottles showed flow lines due to the heterogeneousness of the material, as well as tiny air bubbles due to trapped air. When the extruder was fed with a mixture of virgin powder and coarse ground scrap materials, the aspect of the bottles deteriorated greatly. However, with the addition of the mixing rings, the flow marks, as well as the tiny air bubbles, disappeared and the appearance of the bottles did not deteriorate when a 50/50 blend scrap and virgin materials was used instead of 100% virgin.

*Example IV*

Using the same extruder and screw, connected to a 90° angle blown film die, a clear, slightly plasticized PVC dry blend was fed. This die extruded a thin wall (.020″) tube vertically upwards. The tube was inflated by internal air pressure coming through the die to the point where its diameter was increased to approximately twice the diameter of the die. It was then guided and laid flat in between two pinch rolls. The peripheral speed of the pinch rolls was such, in relation to the output rate of the material through the die, that the film was stretched lengthwise at the same time it was blown transversely. As a total result, the thickness of the film was reduced to approximately a quarter of its value at the exit of the die, i.e., .005″.

Without the use of mixing rings, the film blown on this equipment contained numerous unfluxed particles, often referred to as "fisheyes," and also showed flow marks apparently due to heterogeneousness of the material. However, when mixing rings were added with a gap of .080″ between them at the end of the screw and the barrel of the extruder, the number of "fisheyes" reduced drastically and the flow marks vanished.

*Example V*

Again, using the same extruder, operated this time with a single stage screw with a volumetric compression ratio of 3.5/1 and the film die referred to in Example IV, the extruder was fed with medium density (.940) polyethylene pellets, dry colored with 2% of a green pigment. By dry coloring is meant that the powdery pigment coats the surface of the pellets which have been wet beforehand with a very slight amount of mineral oil (.02%).

In the absence of mixing rings, the dispersion of the pigment in the polyethylene blown film was obviously very poor and could be noticed best by transparency which showed numerous pigment agglomerates and streaks. However, when mixing rings were added, the pigment dispersion improved to the point where individual pigment agglomerates, as well as streaks, disappeared completely.

It is thus apparent that the use of the mixing rings of the present invention provides a highly significant improvement in the mixing and controlling of the plastic material being fed through an extruder apparatus. Furthermore, this invention enables easy conversion of extruding equipment designed for processing of compounds in pelletized form to adapt it to the processing of compounds in powder form (dry blends). Since it is not only more expensive to prepare compounds in pellet form but also more undesirable from the rheological point of view, as such additional processing imparts to the compound an undesirable "heat history," this invention, as can thus easily be seen, has very definite advantages.

In the case of PVC resin processing, it is conventionally necessary to use additives in the resin in order to render them processable in given equipment. Such additives (e.g. stabilizers) have the disadvantage that they increase the cost of raw material considerably, and, in some instances, they are detrimental to the properties of the end product. However, the use of the mixing device of the present invention not only makes it easier to process a given heat sensitive material, but also makes it possible to substantially decrease the amount of stabilizers required in the compound, thereby improving the quality of the product, while decreasing its cost.

The use of this invention provides a decided economic advantage which is obviously highly important in a competitive market, such as exists in this field where profit margins are gradually decreasing.

At the same time, the concept of this invention enables easy conversion of extruding equipment, designed for the processing of compounds in pelletized form, to adapt it for the processing of compounds in powder form (dry blends). This fact is a definite economic advantage since dry blends are considerably cheaper than compounded pellets.

From the foregoing, it is believed that the invention may be readily understood by those skilled in the art without further description, it being borne in mind that numerous changes may be made in the details disclosed without departing from the spirit of the invention as set forth in the following claims.

I claim:

1. A mixing device for extrusion apparatus of the type including a delivery barrel, a relatively rotatable feed screw therein, and an extrusion die; said mixing device comprising at least a pair of coaxial mixing rings, one of said rings being attached to and rotatable with said screw and the other of said rings being fixed within said barrel, opposite peripheries of respective rings having transversely slotted, longitudinally offset, annular rims which extend in radially opposite directions and alternately intersect the flowpath of material being fed through said delivery barrel to said extrusion die, whereby said flowpath is subjected to a series of sequential interruptions, the annular rim of at least one of said rings being of a width less than that of said one ring and laterally off-center on the ring so that one boundary of said rim is spaced a greater distance from the corresponding boundary of its ring than is the opposite boundary of said rim, and means for reversibly connecting said one ring to its support, whereby the longitudinal spacing of the rims of respective rings within said barrel may be selectively varied by reversing the position of said one ring on its support.

2. A mixing device as claimed in claim 1, wherein both of said rims are laterally off-center and both of said rings are reversible.

3. In an extrusion apparatus of the type including a delivery barrel, a relatively rotatable feed screw therein and an extrusion die; a two-ring mixing device comprising a first mixing ring supported on and rotatable with said screw, a second mixing ring coaxial with said first mixing ring and fixedly supported within said barrel, the outer periphery of said first mixing ring being provided with a series of outwardly projecting radial fins which extend longitudinally with respect to said screw, being annularly spaced to provide a series of correspondingly extending slots, the inner periphery of said second ring having a series of inwardly projecting radial fins which also extend longitudinally with respect to said screw and are annularly spaced to provide correspondingly extending slots, said last-named fins being concentric with and longitudinally spaced from said first-named fins, the fins of said first and second rings differing in number to avoid the alignment of all of the slots of respective rings at one time, the fins and slots of said first and second rings intersecting the flowpath of material being fed through said delivery barrel to said extrusion die at longitudinally spaced points, whereby the flowpath of said material is subjected to a series of sequential lateral deflections.

4. A mixing device as claimed in claim 3, including means for longitudinally adjusting said feed screw in said delivery barrel to vary the spacing of said first and second mixing rings.

5. A mixing device as claimed in claim 4, including drive means for said feed screw and means associated with said drive means for longitudinally adjusting said screw in said barrel during operation of the drive means, whereby the spacing of said first and second mixing rings may be steplessly adjusted during operation of the device.

References Cited by the Examiner

UNITED STATES PATENTS

| 2,411,971 | 12/1946 | MacMullen et al. | 18—12 |
|-----------|---------|------------------|-------|
| 2,732,587 | 1/1956 | Greene | 18—12 |
| 2,813,302 | 11/1957 | Beck | 18—12 XR |
| 2,944,286 | 7/1960 | Kullgren et al. | 18—12 |
| 3,035,303 | 5/1962 | Stanley | 18—12 |
| 3,090,992 | 5/1962 | Schlechter et al. | 18—12 |

FOREIGN PATENTS

| 841,743 | 7/1960 | Great Britain. |

WILLIAM J. STEPHENSON, *Primary Examiner.*